US012680350B2

(12) United States Patent
Debroucke et al.

(10) Patent No.: US 12,680,350 B2

(45) Date of Patent: Jul. 14, 2026

(54) ELECTRIC LATCH FOR MOTOR VEHICLE WITH SAFETY CLOSURE RE-ENGAGEMENT

(71) Applicant: Minebea AccessSolutions France, Alfortville (FR)

(72) Inventors: François Debroucke, Abbeville (FR); Jean-Marc Verbrugghe, Abbeville (FR)

(73) Assignee: Minebea AccessSolutions France, Alfortville (FR)

(*) Notice: Subject to any disclaimer, the term of this patent is extended or adjusted under 35 U.S.C. 154(b) by 187 days.

(21) Appl. No.: 18/389,909

(22) Filed: Dec. 20, 2023

(65) Prior Publication Data

US 2024/0209655 A1 Jun. 27, 2024

(30) Foreign Application Priority Data

Dec. 22, 2022 (EP) .................................... 22315350

(51) Int. Cl.
*E05B 81/06* (2014.01)
*E05B 81/14* (2014.01)

(52) U.S. Cl.
CPC .............. *E05B 81/06* (2013.01); *E05B 81/14* (2013.01)

(58) Field of Classification Search
CPC .......... E05B 81/14; E05B 81/36; E05B 81/34; E05B 81/90
See application file for complete search history.

(56) References Cited

U.S. PATENT DOCUMENTS 5,634,677 A * 6/1997 Buscher .................. E05B 81/16 292/216
6,123,371 A * 9/2000 Fisher ..................... E05B 81/16 292/201

(Continued)

FOREIGN PATENT DOCUMENTS

CN 114687621 A * 7/2022 ............. E05B 81/18
DE 19729188 B4 * 8/2008 ............. E05B 77/26

(Continued)

OTHER PUBLICATIONS

Espacenet, machine translation of CN 114687621 A, generated Aug. 21, 2025. (Year: 2025).*

*Primary Examiner* — Kristina R Fulton
*Assistant Examiner* — Emily G. Brown
(74) *Attorney, Agent, or Firm* — Oblon, McClelland, Maier & Neustadt, L.L.P.

(57) ABSTRACT

An electric latch for an opening panel of a motor vehicle, the latch includes a bolt pivoting around a first axis and intended to cooperate with a striker, a release device configured to block the pivoting of bolt in its closing position in order to avoid the release of the striker, an electric actuating device configured to move the release device from its initial position to its release position, the electric actuating device includes a first lever having a first contact zone with the release device, a pivoting of the first lever from its first position to its second position pushing the release device from its initial position to its release position, a second lever being moved between its first position and second positions, a first rod connected to the second lever, a second rod having a handling mean configured to be manipulated from the outside of the electric latch.

14 Claims, 8 Drawing Sheets

(56) References Cited

U.S. PATENT DOCUMENTS

Figure 1:
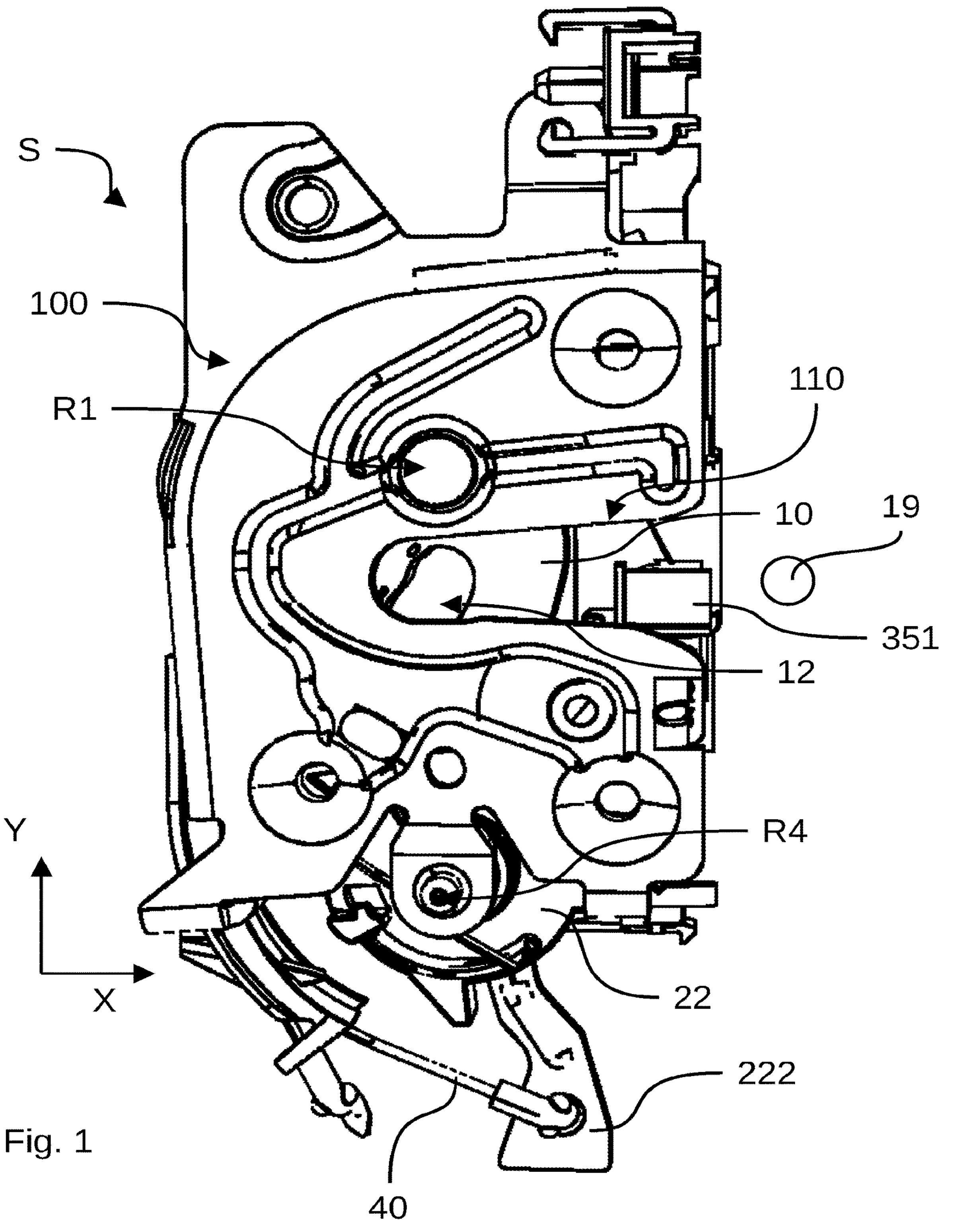

| | | | | |
|---|---|---|---|---|
| 6,499,776 | B2 * | 12/2002 | Takamura | E05B 81/20 292/216 |
| 8,141,916 | B2 * | 3/2012 | Tomaszewski | E05B 81/14 292/216 |
| 11,377,883 | B2 | 7/2022 | Taurasi et al. | |
| 2002/0167179 | A1 * | 11/2002 | Takamura | E05B 81/14 292/201 |
| 2010/0117379 | A1 * | 5/2010 | Mitchell | E05B 85/02 292/201 |
| 2019/0161996 | A1 * | 5/2019 | Taurasi | E05B 81/36 |
| 2023/0074045 | A1 | 3/2023 | Fuchs | |

FOREIGN PATENT DOCUMENTS

| | | | |
|---|---|---|---|
| WO | WO 2008/104073 | A1 | 9/2008 |
| WO | WO 2021/151423 | A1 | 8/2021 |

* cited by examiner

X
Y
Z
10
12
R1
R3
21
211
213
223
R4
22
20
222
221
311
31
32
R2
342
341
34
320
30
330
312
343
35
33
351
352
S

ELECTRIC LATCH FOR MOTOR VEHICLE WITH SAFETY CLOSURE RE-ENGAGEMENT

TECHNICAL FIELD

The present invention relates to an electric latch for an opening panel of a motor vehicle, in particular for a door, a hatchback, or a trunk of a motor vehicle.

BACKGROUND

The statements in this section merely provide background information related to the present disclosure.

A motor vehicle latch is intended to be fixedly mounted on an opening panel of a motor vehicle and typically includes a bolt intended to pivot, during closure, in one direction around a striker fastened on the structure of the motor vehicle in order to ensure closure of the opening panel. Opening of the door leaf is enabled by a rotation of the bolt in the reverse direction. The rotation in the reverse direction during opening of the opening panel follows the displacement of the external or internal panel which is linked to the latch through a control means which generally acts on an opening lever in order to make a lever pivot which releases the bolt via a hooking device or a stopper in the desired direction.

In the process of electrically opening a latch in normal operation, a pawl that retains the bolt is driven by an electric actuator in an opening position so as to release the bolt. As soon as it is no longer retained by the pawl, the bolt can pivot so as to release the striker.

However, if the electric actuator has a failure or if the electrical power source is down or insufficient when the pawl in its opening position, the bolt is free to pivot and it is impossible to close back the opening panel.

One aim of the present invention is to prevent at least partially the drawbacks of the prior art and to provide an electrical latch with a safety closing device when the electrical actuator has a failure or the electrical power source is down or insufficient.

SUMMARY

To this end, the invention relates to an electric latch for an opening panel of a motor vehicle, said latch comprising:

- a bolt pivoting around a first axis and intended to cooperate with a striker,
- a release device movable between a initial position and an release position, said release device being configured to block the pivoting of bolt in its closing position in order to avoid the release of the striker,
- an electric actuating device configured to move the release device from its initial position to its release position, wherein said electric actuating device comprises:

- a first lever pivoting around a second axis between a first position and a second position, said first lever comprising a first contact zone with the release device, a pivoting of the first lever from its first position to its second position pushing the release device from its initial position to its release position,
- a second lever pivoting between a first position and a second position around the same second axis as the first lever, said second lever being moved by an actuator between its first position and second positions,

- a first rod connected to the second lever and being moved angularly around the second axis by the second lever, said first rod being also engaged with the first lever in order to transfer the pivoting of the second lever from its first position to its second position to the first lever in order to pivot said first lever from its first position to its second position,
- a second rod comprising a handling mean configured to be manipulated from the outside of the electric latch, said second rod being also connected to the first rod in order to disengage the first rod (34) from the first lever when manipulated.

According to an aspect of the invention, the first rod may have a pivot link with the second lever, said pivot link being offset from the second axis of the second lever, said first rod also comprising a first stopper in contact with a second contact zone of the first lever, when manipulated, the second rod pivots the first rod around its pivot link and disengages the first stopper from the first lever.

According to another aspect of the invention, the first stopper of the first rod and the second contact zone of the first lever may have their back curved or inclined to permit the re-engagement of the first rod with the first lever.

According to another aspect of the invention, the first rod and the second rod comprise a curved pivot-sliding link in order to permit the angular movement of the first rod with the second lever when said second lever pivots around its second axis.

According to another aspect of the invention, the second rod mays comprise a pivot link at a first extremity, and the handling mean may be placed between said pivot link and the connection of the second rod with the first rod.

According to another aspect of the invention, the electric latch may comprise an elastic mean connected to the first lever in order to pivot back said first lever from its second position to its first position when the first rod is disengaged.

According to another aspect of the invention, the electric latch may comprise a housing, the handling mean being placed on a face of the housing intended to be accessible from the outside of the opening panel.

According to another aspect of the invention, the housing may comprise a front face intended to be placed in front of the striker, said front face comprising a guide slot in which the striker can slide and be guided to the bolt, and the handling mean may be placed on said front face.

According to another aspect of the invention, the handling mean may be a pushing zone and the housing comprises an opening placed in front of said pushing zone.

According to another aspect of the invention, the second axis of the first and second levers may be perpendicular to the first axis of the bolt.

According to another aspect of the invention, the second lever may comprise at least one toothed extremity cooperating with a worm screw actuated by the actuator.

According to another aspect of the invention, the release device may comprise:

- a pawl pivoting around a fourth axis between a releasing position and a blocking position, said pawl comprising a second stopper intended to be engaged with the bolt in the blocking position of the pawl in order to prevent a pivoting of said bolt, in its releasing position, the pawl is disengaged from the bolt,
- a third lever pivoting around a fourth axis between a first position to a second position, said third lever also comprising a third stopper in contact with the first contact zone of the first lever, the pivoting of the first lever from its first position to its second position causing the pivoting of the third lever from its first position to its second position, the pawl and the third lever may be connected so that a pivoting of the third lever from its first position to its second position causes a pivoting of the pawl form its blocking position to its releasing position.

According to another aspect of the invention, the electric latch may comprise a first elastic mean connected to the pawl in order to pivot back said pawl to its blocking position.

According to another aspect of the invention, the electric latch may comprise a second elastic mean connected to the third lever in order to pivot back said third lever to its first position when the first lever is in its first position.

According to another aspect of the invention, the third lever may comprise an extremity intended to be linked to a manual actuating system in order to pivot said third lever from its first position to its second position.

DRAWINGS

Figure 2:
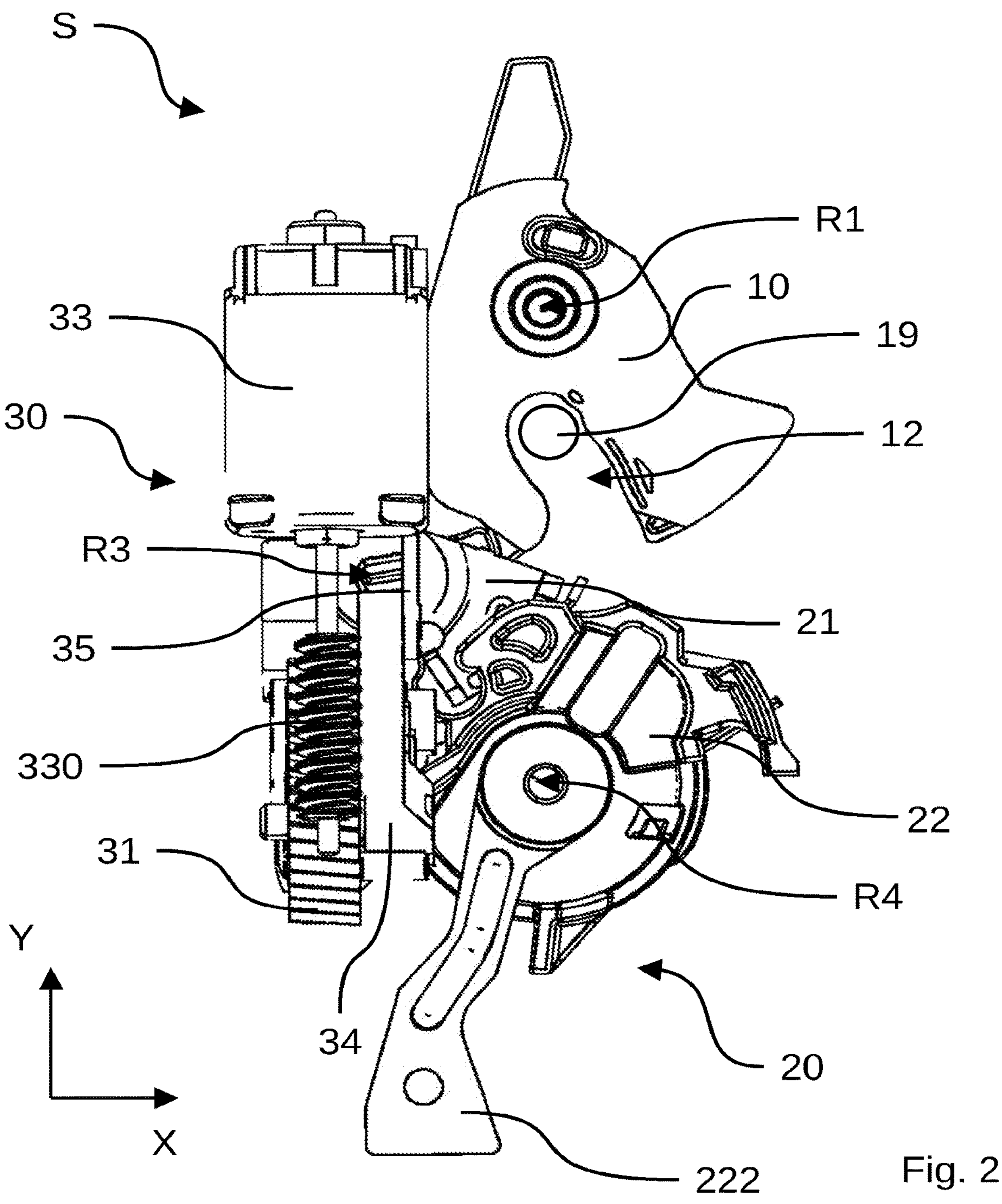
Figure 3:
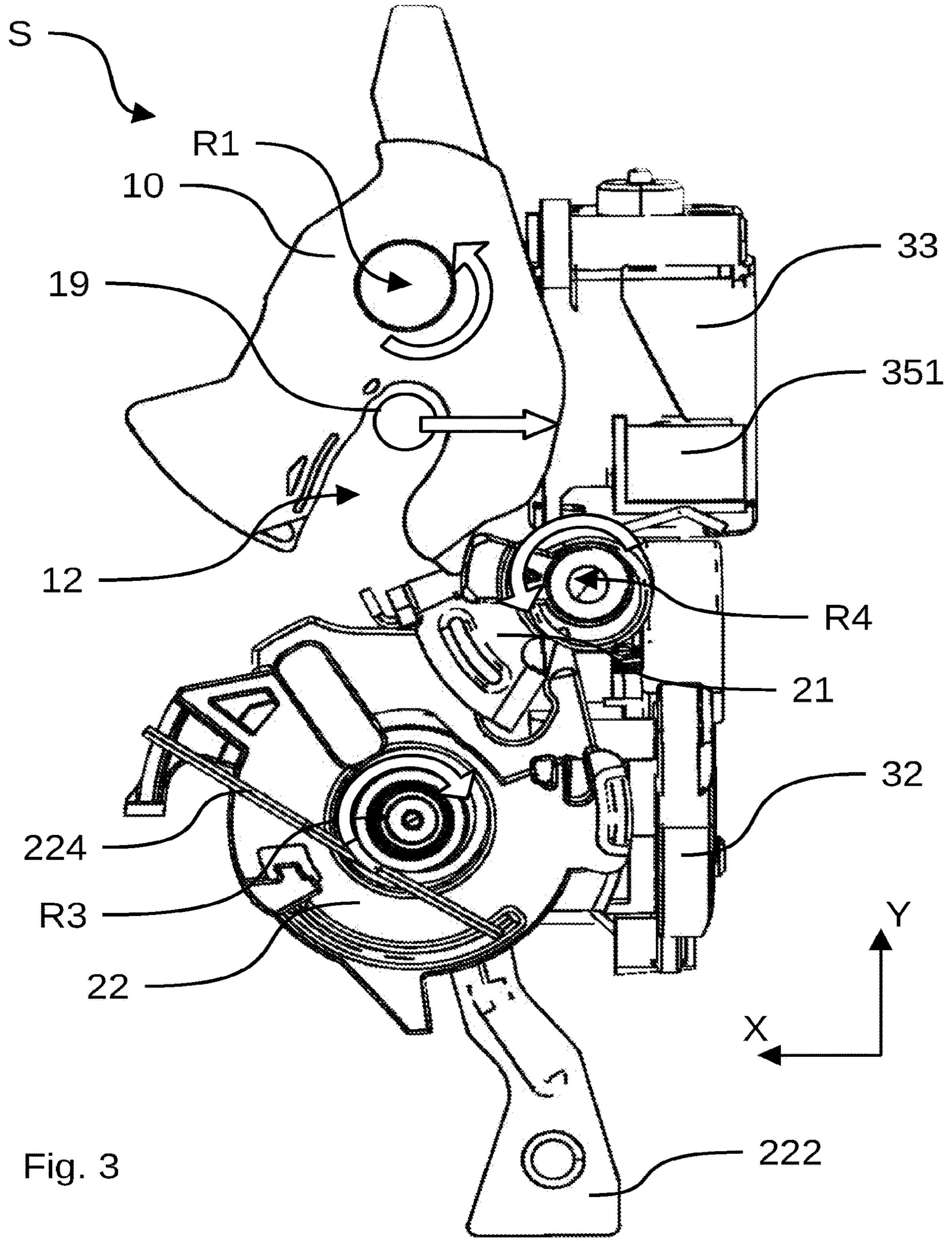
Figure 4:
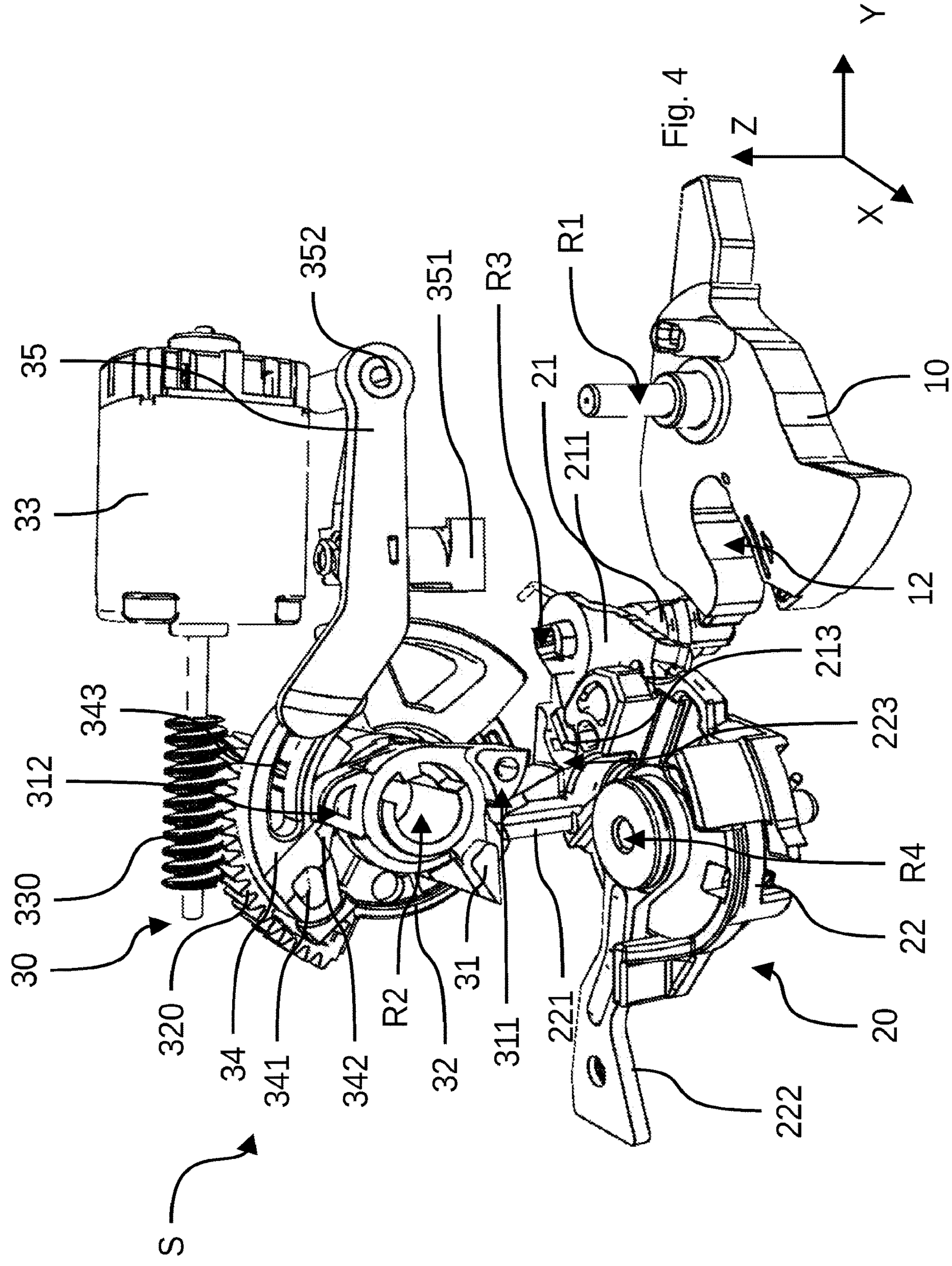
Figure 5:
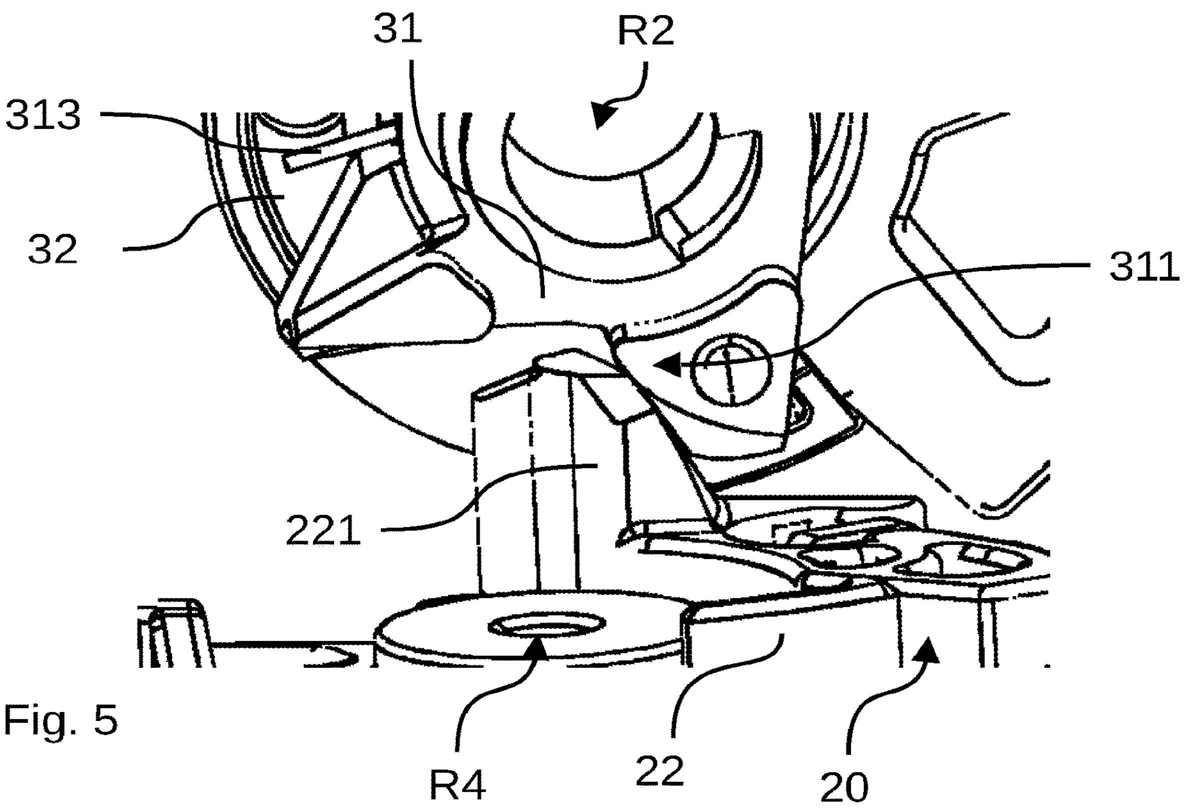
Figure 6:
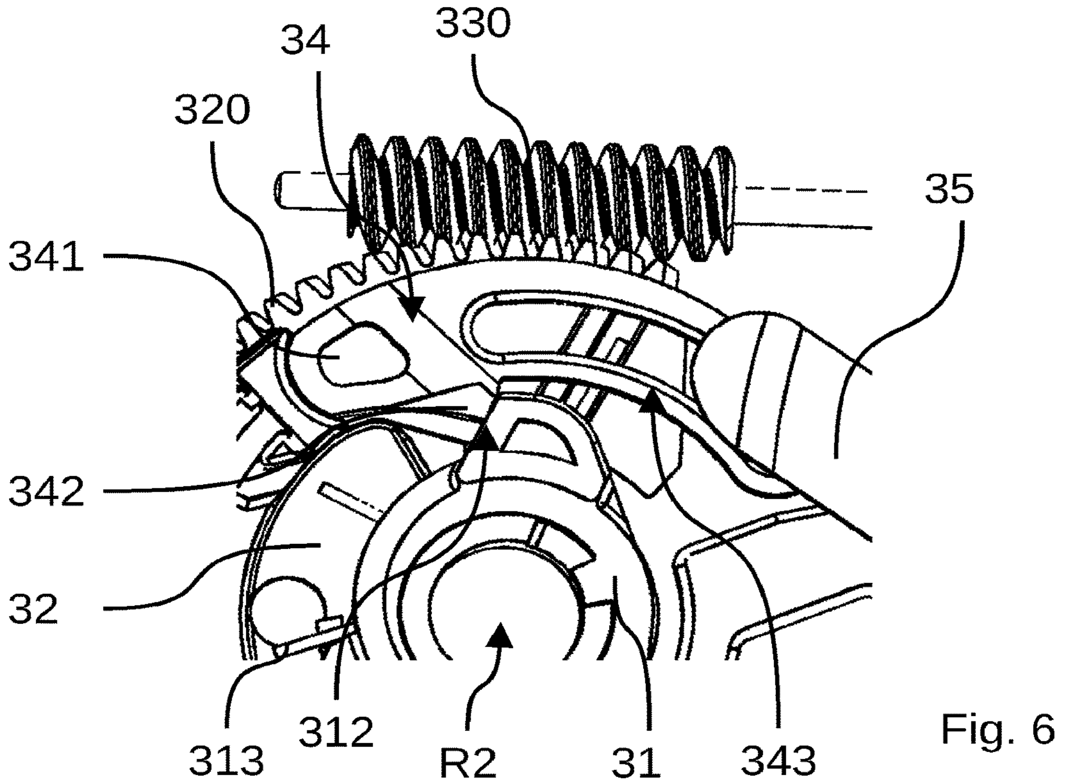
Figure 7:
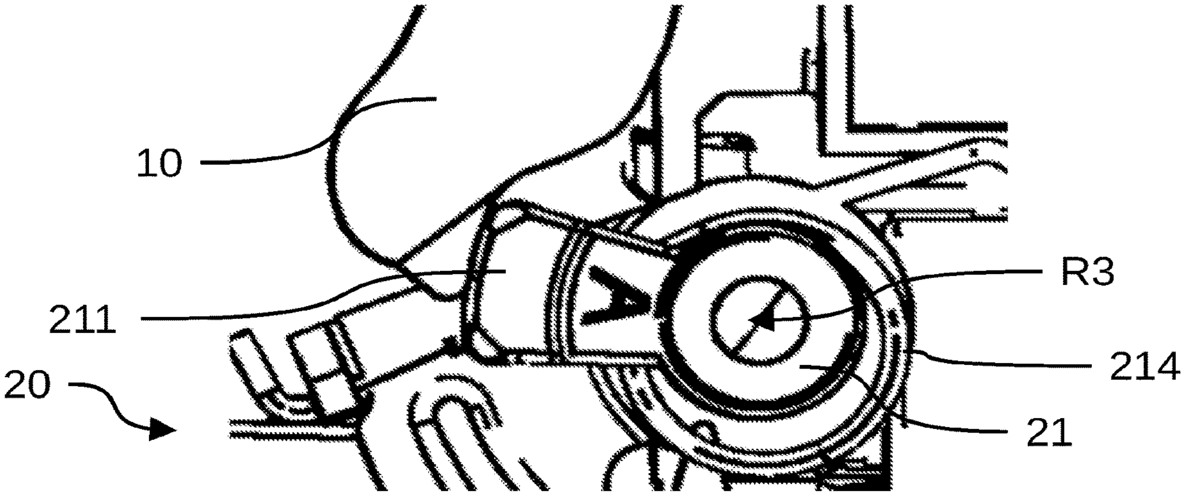
Figure 8:
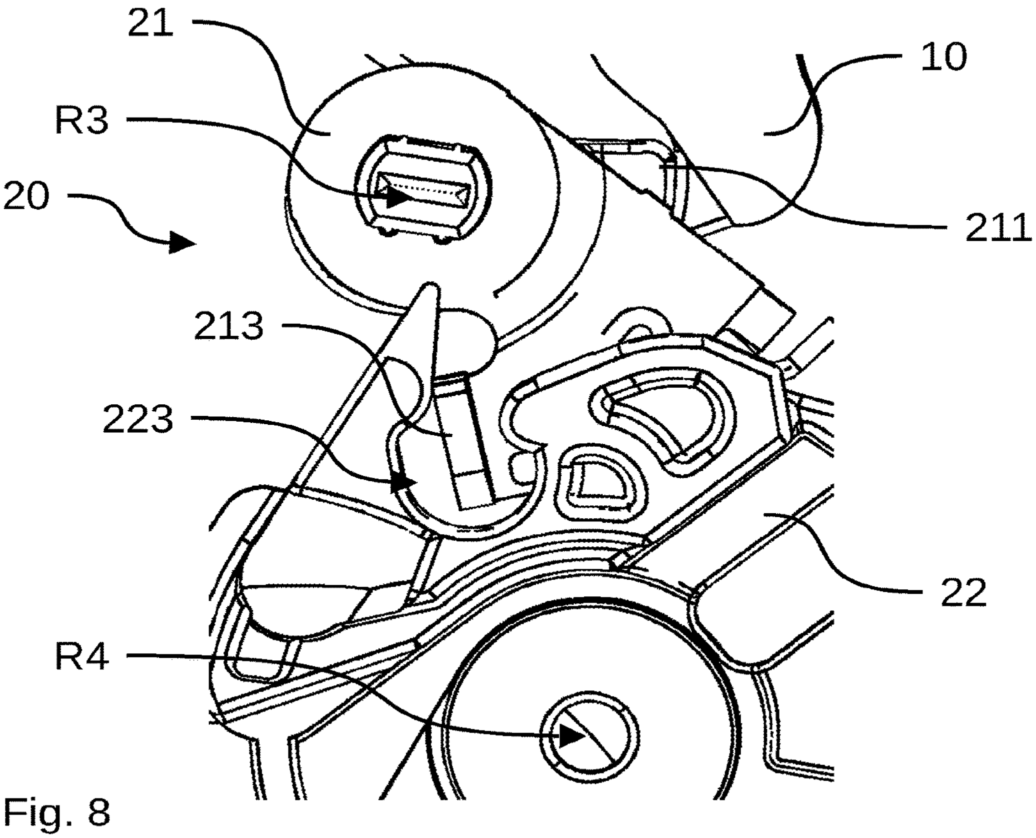

Further features and advantages of the invention will become apparent from the following description, given by way of non-limiting example, with reference to the appended drawings, in which:

FIG. 1 is a schematic representation of a front face of a latch with its housing, FIG. 2 is a schematic representation of the front face of the latch of FIG. 1 without its housing, FIG. 3 is a schematic representation of the back face of the latch of FIG. 1 without its housing, FIG. 4 is a schematic representation in perspective of the latch of FIG. 1 without its housing, FIG. 5 is a schematic representation of the connection between the first lever and the third lever, FIG. 6 is a schematic representation of the connection between the first lever and the first rod, FIG. 7 is a schematic representation of the connection between the pawl and the bolt, FIG. 8 is a schematic representation of the connection between the third lever and the pawl, FIGS. 9 to 12 are schematic representations of the actuating device kinematic in case of a failure of the actuator.

In these figures, identical elements bear the same reference numbers. The following implementations are examples. Although the description refers to one or more embodiments, this does not necessarily mean that each reference relates to the same embodiment or that the features apply only to a single embodiment. Individual features of different embodiments can also be combined or interchanged to provide other embodiments.

DETAILED DESCRIPTION

FIGS. 1 to 4 have a trihedron with three axis X, Y and Z. The X axis represents a longitudinal axis corresponding for example of the displacement of the opening panel from an open position to a closed position. The Y axis represent a height axis corresponding with an axis perpendicular with the longitudinal axis X, for example the height of the motor vehicle. The Z axis represent a depth axis perpendicular with both the longitudinal axis X and the height axis Y, for example the length of the vehicle.

FIGS. 1 to 4 show an electrical latch S for an opening panel of a motor vehicle, in different point of view.

The latch S comprises a bolt 10 pivoting around a first axis R1 and intended to cooperate with a striker 19. In the examples illustrated in FIGS. 1 to 4, the first axis R1 is parallel with the depth axis Z. The bolt 10 may have a fork-like shape delimiting a notch 12 adapted to receive the striker 19. In the locked position of the latch S, the bolt 10 is blocked in rotation at least in one way in order to avoid the release of the striker 19.

The latch S also comprises a release device 20 movable between an initial position and a release position. In its initial position, the release device 20 is configured to block the pivoting of bolt 10 in order to avoid the release of the striker 19. This release device 20 will be described in more details later in the present description.

The latch S comprises an electric actuating device 30 configured to move the release device 20 from its initial position to its release position. As shown in FIG. 4, this electric actuating device 30 comprises a first lever 31, a second lever 32, a first rod 34 and a second rod 35 linked together in a kinematic movement.

The actuating device 30 comprises a first lever 31 pivoting around a second axis R2 between a first position and a second position. In the example illustrated in FIG. 4, the second axis R2 is parallel with the longitudinal axis X. Thus, the second axis R2 of the first lever 31 may be perpendicular to the first axis R1 of the bolt 10.

The first lever 31 comprises a first contact zone 311 with the release device 20. This contact zone 311 is shown in more details on FIG. 5. In FIG. 5, the first lever 31 is in its first position and the release device 20 is in its initial position. A pivoting of the first lever 31 from its first position to its second position, here in a clockwise rotation, pushes the release device 20 from its initial position to its release position.

As shown in FIG. 4, the actuating device 30 comprises a second lever 32 pivoting between a first position and a second position around the same second axis R2 as the first lever 31. The second lever 32 is moved by an actuator 33 between its first position and second positions. The second lever 32 comprises at least one toothed extremity 320 cooperating with a worm screw 330 actuated by the actuator 33.

Still as shown in FIG. 4, the actuating device 30 comprise a first rod 34 connected to the second lever 32. This first rod 34 moves angularly around the second axis R2 and is driven by the second lever 32. The first rod 34 is also engaged with the first lever 31 in order to transfer the pivoting of the second lever 32 from its first position to its second position to the first lever 31, in order to pivot said first lever 31 from its first position to its second position. As shown in more details in FIG. 6, the first rod 34 may have a pivot link 341 with the second lever 32. This pivot link 341 may be offset from the second axis R2 of the second lever 32.

Still as shown in FIG. 4, the actuating device 30 also comprise a second rod 35. This second rod 35 comprises a handling mean 351 configured to be manipulated from the outside of the electric latch S. The second rod 35 is also connected to the first rod 34 in order to disengage the first rod 34 from the first lever 31 when manipulated.

This particular design of the actuating device 30 permits to disengage the failing actuator 33 form the release device 20 in order to make the release device 20 come back to its initial position. Thus, the bolt 10 can be blocked again in order to avoid the releasing of the striker 19. The opening panel can be locked even if the actuator 33 has a failure.

The second rod 35 may comprises a pivot link 352 at a first extremity, for example with a housing 100 of the latch S. The handling mean 351 may thus be placed between the pivot link 352 and the connection of the second rod 35 with the first rod 34. The second rod 35 thus acts as a lever to disengage the first rod 34 from the first lever 31.

As shown in FIG. 6, the first rod 34 may also comprise a first stopper 342 in contact with a second contact zone 312 of the first lever 31. When manipulated, the second rod 35 may pivot the first rod 34 around its pivot link 341 and disengage the first stopper 342 from the first lever 31. The first stopper 342 of the first rod 34 and the second contact zone 312 of the first lever 31 may have their back, the faces of the first stopper 342 ant the second contact zone 312 opposed to their face in contact, curved or inclined to permit the re-engagement of the first rod 34 with the first lever 31.

The first rod 34 and the second rod 35 may comprise a curved pivot-sliding link 343 in order to permit the angular movement of the first rod 34 with the second lever 32 when the second lever 32 pivots around its second axis R2.

As shown for example in FIG. 1, the latch S may comprise a housing 100. The handling mean 351 of the second rod 35 may be advantageously placed on a face of the housing 100 intended to be accessible from the outside of the opening panel.

The handling mean 351 may be is a pushing zone. Thus, the housing 100 may comprise an opening placed in front of said pushing zone in order to be accessible from the outside of the opening panel. This pushing zone 351 can be internal of the latch S as represented in FIGS. 1 to 4. In this case, a tool, for example the key of the vehicle, may be necessary to push the pushing zone 351. The pushing zone 351 may also pass through this opening in the housing 100 and be directly accessible outside said housing 100.

The housing 100 may comprise a front face intended to be placed in front of the striker 19. This front face may comprise a guide slot 110 in which the striker 19 can slide and be guide to the bolt 10. The handling mean 351 may be advantageously placed on said front face. This placement permits a direct access of the handling mean without any additional machining to manage in the opening panel an access to the handling mean 351.

As illustrated in FIGS. 2 to 4, the release device 20 may comprise a pawl 21 and a third lever 22.

The pawl 21 may pivot around a third axis R3 between a releasing position and a blocking position of the bolt 10. As shown in more details in FIG. 7, the pawl 21 may comprise a second stopper 211 intended to be engaged with the bolt 10 in the blocking position of the pawl 21. Thus, in its blocking position, the pawl 21 prevents a pivoting of the bolt 10. In its releasing position, the pawl 21 is disengaged from the bolt 10, permitting it to pivot. In FIGS. 1 to 4 and 7, the pawl 21 is in its blocking position. The release device 20 is then in its initial position.

The third lever 22 may pivot around a fourth axis R4 between a first position and a second position. In FIGS. 1 to 4 and 5, the third lever 22 is in its first position. As illustrated in FIG. 5, the third lever 22 may also comprising a third stopper 221 in contact with the first contact zone 311 of the first lever 31. The pivoting of the first lever 31 from its first position to its second position causes the pivoting of the third lever 22 from its first position to its second position.

The third lever 22 may also comprise an extremity 222 intended to be linked to a manual actuating system 40 in order to pivot said third lever 22 from its first position to its second position. In the example illustrated FIG. 1, this actuating system is a cable 40 with a first extremity connected to the third lever 22 and a second extremity connected to a handle (not represented).

The pawl 21 and the third lever 22 may be connected so that a pivoting of the third lever 22 from its first position to its second position causes a pivoting of the pawl 21 form its blocking position to its releasing position. As shown in FIG. 8, this connection between the pawl 21 and the third lever 22 may be made by protrusion 213 borne by one of these elements. This protrusion 213 may be placed in a notch 223 borne by the other element.

In the example illustrated, the protrusion 213 is borne by the pawl 21 and the notch 223 by the third lever 22. This connection between the pawl 21 and the third lever 22 is active in both ways. A pivoting of the third lever 22 from its first position to its second position causes a pivoting of the pawl 21 form its blocking position to its releasing position. Conversely, pivoting of the third lever 22 from its second position to its first position causes a pivoting of the pawl 21 form its releasing position to its blocking position.

The latch S may also comprise at least one elastic mean 214, 224 to return passively the release device 20 from its release position to its initial position. Thus, the latch S may comprise a first elastic mean 214 (visible in FIG. 7) connected to the pawl 21 in order to pivot back said pawl 21 to its blocking position. The latch S may also comprise, alone or in combination with the first elastic mean 214, a second elastic mean 224 (visible in FIG. 3) connected to the third lever 22 in order to pivot back said third lever 22 to its first position when the first lever 31 is in its first position.

The latch S may also comprise a dedicated elastic mean 313 (visible in FIGS. 5 and 6) connected to the first lever 31 in order to pivot back said first lever 31 from its second position to its first position when the first rod 34 is disengaged.

As mentioned before, in FIGS. 1 to 8, the release device 20 is in its initial position. The first lever 31 and the second lever 32 are both in their first position.

FIGS. 9 to 12 show the latch S and more specifically the actuating device 30 kinematic in case of a failure of the actuator 33.

Figure 9:
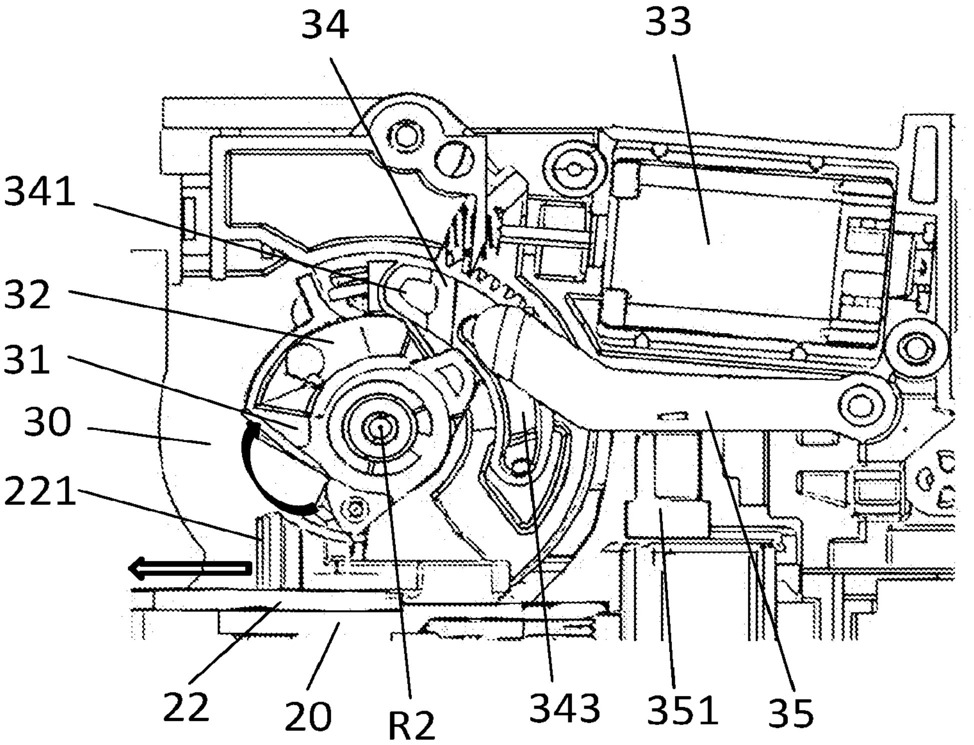

In FIG. 9, the latch S is released. The actuator 33 drives the second lever 32 to its second position. The first rod 34 is engaged with the first lever 31 and transmits the pivoting of the second lever 32 to the first lever 31. The second rod 35 stays in place thanks to its curved pivot-sliding link 343 with the first rod 34. The first lever 31 moves the release device 20 to its release position, here by pushing the second stopper 221 of the third lever 22 and moving the pawl 21 to its releasing position.

Figure 10:
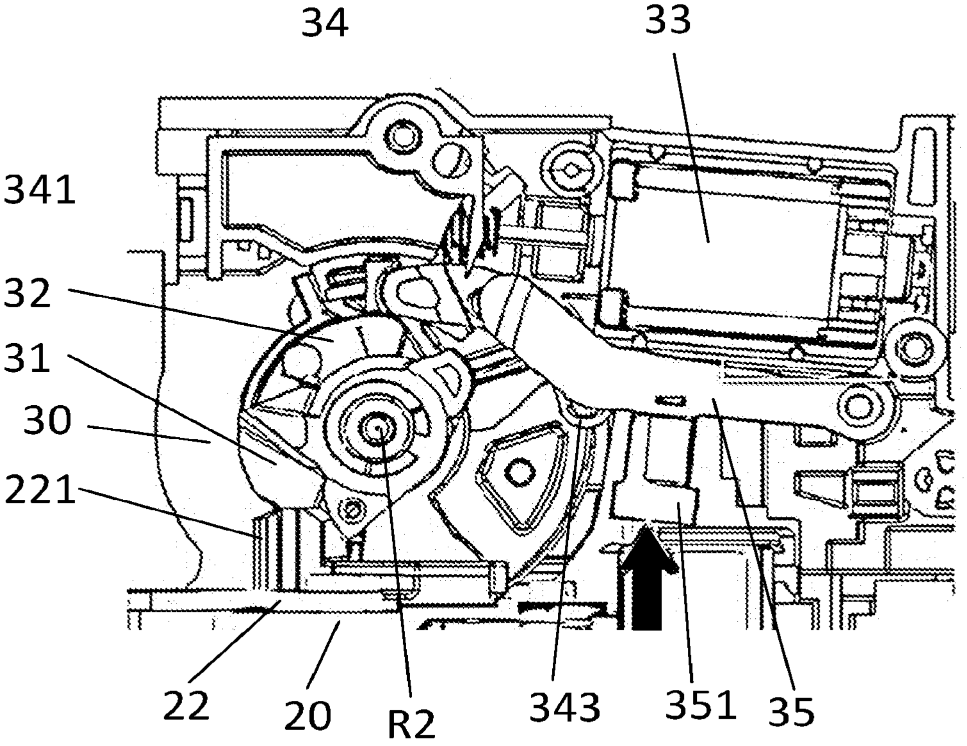

The FIG. 10 shows a first step of a safety procedure if the actuator 33 has a failure or if the power supply of the actuator 33 is insufficient. The latch S and more specifically the release device 20 is also blocked in its release position. The second lever 32 is here blocked in its second position. In this first step, the handling mean 351 of the second rod 35 is pushed in order to disengage the first rod 34.

Figure 11:
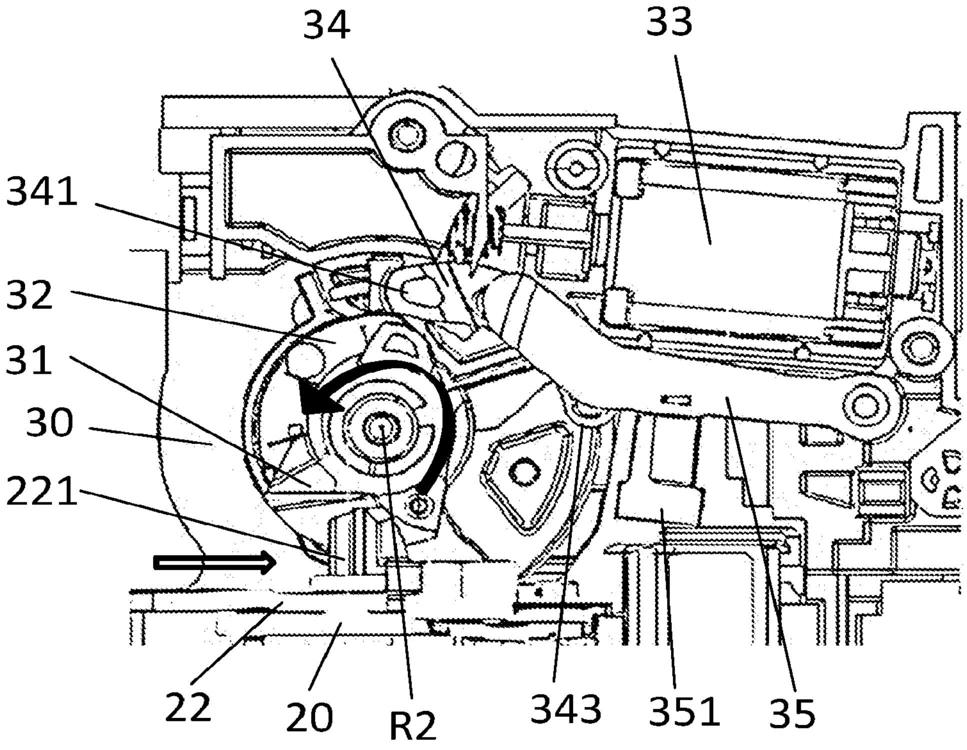

The FIG. 11 shows a second step of the safety procedure. Due to the disengagement of the first rod 34 with the first lever 31, the first lever 31 is free to pivot around its second axis R2. The first lever 31 pivots back passively from its second position to its first position, for example thanks to its elastic mean 313. The release device 20 moves also back to its initial position, here by a passive return of the third lever 22 and/or the pawl 21 to respectively their first position and blocking position, thanks to the first 214 and/or second 224 elastic means. The second lever 32 and the first rod 34 do not pivot around the second axis R2 and stay in place.

Figure 12:
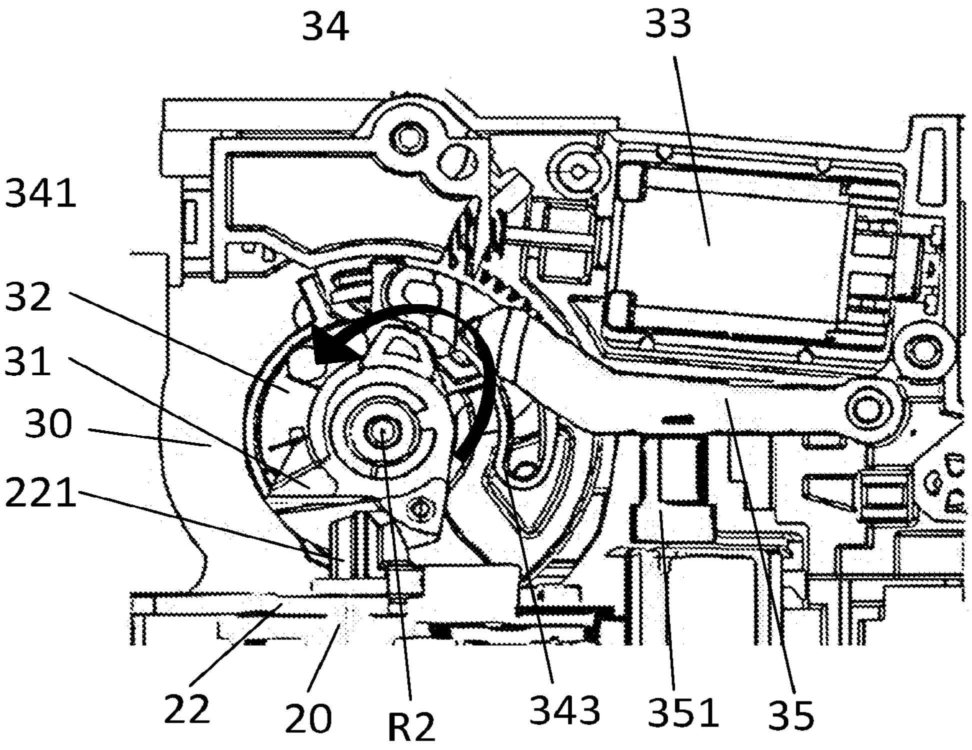

The FIG. 12 shows a third step of the safety procedure. In this third step, the second rod 35 and the first rod 34 come back to their initial positions. However, the first rod 34 is not yet engaged back with the first lever 31. The first stopper 342 of the first rod 34 is not in front of the second contact zone 312 of the first lever 31. To re-engage the first rod 34 and the first lever 31, the second lever 32 has to move back to its first position.

This is possible only if the cause of the failure of the actuator 33 is solved.

The invention claimed is:

1. An electric latch for an opening panel of a motor vehicle, said latch comprising:

a bolt pivoting around a first axis and intended to cooperate with a striker, a release device movable between an initial position and a release position, said release device being configured to block a pivoting of the bolt from a closed position in order to avoid the release of the striker, an electric actuating device configured to move the release device from its initial position to its release position, wherein said electric actuating device comprises:

a first lever pivoting around a second axis between a first position and a second position, said first lever comprising a first contact zone with the release device, a pivoting of the first lever from its first position to its second position pushing the release device from its initial position to its release position, a second lever pivoting between a first position and a second position around the same second axis as the first lever, said second lever being moved by an actuator between its first position and second position, a first rod connected to the second lever and being moved angularly around the second axis by the second lever, said first rod being also engaged with the first lever in order to transfer the pivoting of the second lever from its first position to its second position to the first lever in order to pivot said first lever from its first position to its second position, a second rod comprising a handling means configured to be manipulated from the outside of the electric latch, said second rod being also connected to the first rod in order to disengage the first rod from the first lever when manipulated, and wherein the first rod has a pivot link with the second lever, said pivot link being offset from the second axis of the second lever, said first rod also comprising a first stopper in contact with a second contact zone of the first lever, when manipulated, the second rod pivots the first rod around its pivot link and disengages the first stopper from the first lever.

2. The electric latch according to claim 1, wherein the first stopper of the first rod and the second contact zone of the first lever have their back curved or inclined to permit the re-engagement of the first rod with the first lever.

3. The electric latch according to claim 1, wherein the first rod and the second rod comprise a curved pivot-sliding link in order to permit the angular movement of the first rod with the second lever when said second lever pivots around the second axis.

4. The electric latch according to claim 1, wherein the second rod comprises a pivot link at a first extremity, and wherein the handling means is placed between said pivot link and the connection of the second rod with the first rod.

5. The electric latch according to claim 1, wherein it comprises an elastic means connected to the first lever in order to pivot back said first lever from its second position to its first position when the first rod is disengaged.

6. The electric latch according to claim 1, wherein it comprises a housing, the handling means being placed on a face of the housing and the handing means is configured to be accessible from outside of the opening panel.

7. The electric latch according to claim 6, wherein the housing comprises a front face intended to be placed in front of the striker, said front face comprising a guide slot in which the striker can slide and be guided to the bolt, and wherein the handling means is placed on said front face.

8. The electric latch according to claim 6, wherein the handling means is a pushing zone and the housing comprises an opening placed in front of said pushing zone.

9. The electric latch according to claim 1, wherein the second axis of the first and second levers is perpendicular to the first axis of the bolt.

10. The electric latch according to claim 1, wherein the second lever comprises at least one toothed extremity cooperating with a worm screw actuated by the actuator.

11. The electric latch according to claim 1, wherein the release device comprises:

a pawl pivoting around a third axis between a releasing position and a blocking position, said pawl comprising a second stopper intended to be engaged with the bolt in the blocking position of the pawl in order to prevent a pivoting of said bolt, in its releasing position, the pawl is disengaged from the bolt, and a third lever pivoting around a fourth axis between a first position to a second position, said third lever also comprising a third stopper in contact with the first contact zone of the first lever, the pivoting of the first lever from its first position to its second position causing the pivoting of the third lever from its first position to its second position, the pawl and the third lever are connected so that a pivoting of the third lever from its first position to its second position causes a pivoting of the pawl from its blocking position to its releasing position.

12. The electric latch according to claim 11, further comprising a first elastic means connected to the pawl in order to pivot back said pawl to its blocking position.

13. The electric latch according to claim 11, further comprising a second elastic means connected to the third lever in order to pivot back said third lever to its first position when the first lever is in its first position.

14. The electric latch according to claim 11, wherein the third lever comprises an extremity intended to be linked to a manual actuating system in order to pivot said third lever from its first position to its second position.

* * * * *